Nov. 9, 1965 L. NAMENYI-KATZ 3,217,111
APPARATUS FOR CORRECTING RECORDING DISTORTION
Filed Feb. 23, 1961
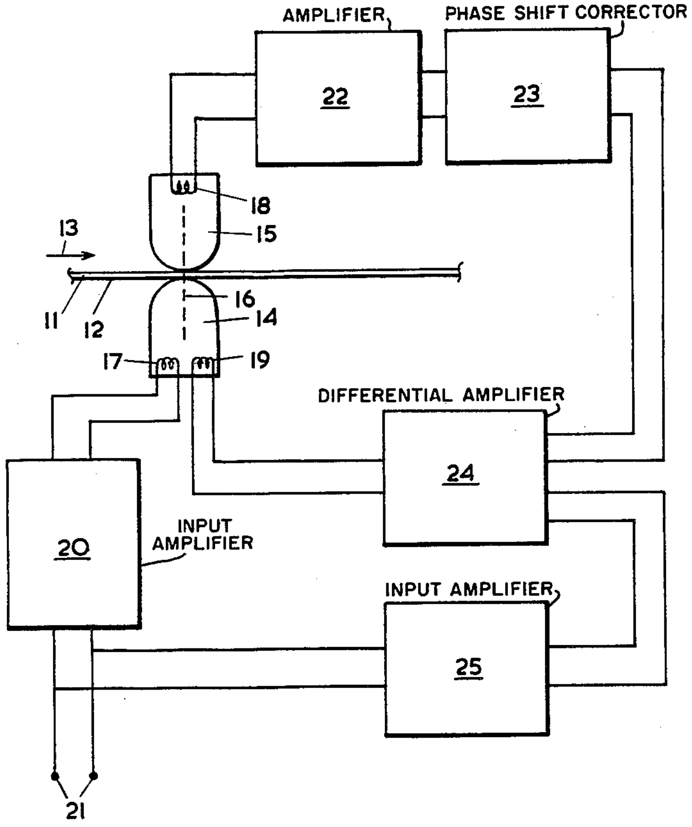
INVENTOR
LASZLO NAMENYI-KATZ
Attys.

United States Patent Office
3,217,111
Patented Nov. 9, 1965

3,217,111
APPARATUS FOR CORRECTING RECORDING DISTORTION

Laszlo Nameyni-Katz, 66 Porchester Gate, London, England

Filed Feb. 23, 1961, Ser. No. 91,120
Claims priority, application Great Britain, Feb. 25, 1960, 2,678/60
11 Claims. (Cl. 179—100.2)

This invention relates to a system for correcting recording distortion in magnetic recording, and to a magnetic tape recorder for correcting recording distortion.

In the conventional magnetic tape recorder the recording head comprises a magnetic circuit containing a narrow gap and provided with a winding. The tape is transported at a uniform speed past the gap and signals to be recorded are passed through the winding, to produce a magnetic field which varies in correspondence with the signals, so that the magnetic material carried on the tape is selectively magnetized as it passes the gap.

It is possible to amplify signals for recording without introducing any appreciable distortion, but distortion always occurs in the recording process.

Although magnetic recording is now very widely practised no fully satisfactory explanation of the true recording process has yet been given, and peculiar difficulties are met in endeavouring to obtain experimental evidence to prove or disprove any particular theory. One theory is that much of the distortion occurs in the recording head. Another theory is that it results from the behaviour of the magnetic oxide when it is magnetized. The principal object of the present invention is to correct a large proportion of the distortion.

The invention consists of a system for magnetic recording on magnetic tape wherein the tape is passed between two magnetic heads having gaps in their magnetic circuits precisely aligned with each other on opposite sides of the tape, the two magnetic heads being in contact with the respective faces of the tape, signals are applied to the one magnetic head in contact with the magnetic face of the tape, signals are derived from the other magnetic head and are fed to means producing a feedback signal and the feedback signal is applied to the one magnetic head to correct recording distortion.

Conveniently the signals derived from the other magnetic head are compared with the signals being recorded, a difference signal being derived for use as a feedback signal. The feedback signal may be modified to allow for distortion produced in the other magnetic head and provision may be made to correct phase shift occurring in the feedback loop.

The feedback signal may be applied to an additional winding in the first magnetic head.

In another aspect the invention consists of a magnetic tape recorder including a first magnetic head for recording, a second magnetic head for producing a monitoring signal, means to feed magnetic tape between the two heads at a desired speed, means to hold the two magnetic heads in contact with opposite faces on the tape with the magnetic surface in contact with the recording head, the gaps in the magnetic circuits of the two magnetic heads being precisely in line with each other on opposite sides of the tape, means to feed recording signals to the recording head, means to compare the recording signals with a monitoring signal derived from the second head, and means to derive therefrom a feedback signal for application to the recording head as a correcting signal.

Conveniently the recording head is provided with two windings, one winding being fed with signals to be recorded and the second winding being fed with the feedback signals.

A preferred form of the invention will now be described by way of example only, reference being made to the accompanying drawing the sole figure of which is a diagrammatical representation of said preferred form of the invention.

Referring to the drawing, a magnetic tape 11 is coated on one face 12 with a magnetic material capable of being selectively magnetized. The tape 11 is capable of being fed in the direction of the arrow 13 by means well known in the art, such as by passing the tape over a motor driven capstan pulley or pulleys (not shown). The tape is passed between two magnetic heads 14 and 15 which are maintained in contact with opposite side faces respectively of the tape as by means of known spring tension devices (not shown). Both the magnetic heads 14 and 15 have a gap precisely set on the dotted line 16 so that the two gaps are accurately aligned.

The magnetic head 14, which may be termed the recording head, has a first winding 17 connected to a conventional recording or input amplifier 20 so that an input signal to be recorded applied to input terminals 21 of the amplifier 20 will cause a varying magnetic field to be set up across the gap in the head 14, thereby selectively magnetizing the coating 12.

The magnetic head 15 is conveniently of similar shape to the head 14 and may be termed a monitoring head. The head 15 has a winding 18 connected to the input of an amplifier 22 the output of which is connected to the input of a circuit 23 which corrects phase shift and effects an amplitude balance of the signal from amplifier 22. The output of circuit 23 is fed to one of the inputs of a differential amplifier 24 the output of which is fed to a second winding 19 in the head 14. The other input of the amplifier 24 is connected to the output of a further input amplifier 25, the input of which is connected to the input terminals 21. The amplifiers 22, 24 and 25 and the circuit 23 may be designed according to techniques well known to those skilled in the art. The circuitry from winding 18 through amplifier 22, circuit 23, amplifier 24 to winding 19 comprises a feedback loop or circuit.

Since the tape 11 is selectively magnetized by the winding 17 it induces signal currents in the winding 18 of the monitoring head 15; part of the flux of the recording head 14 may also influence the monitoring head 15 directly, through the thickness of the tape 11. The induced signals are amplified by the amplifier 22, phase and amplitude balanced by the circuit 23 and compared in the amplifier 24 with the amplified input signal being recorded on the tape. A difference signal is derived which corresponds with the distortion introduced in the recording process and also the distortion due to the monitoring head 15. (The distortion due to the monitoring head 15 is small compared with the total distortion.) This difference signal is amplified in the circuit 24 and fed to the winding 19 as an additional feedback signal to correct for recording distortion.

In order to provide the highest degree of correction, the distortion due to the monitoring head 15 may be substantially offset by suitable modification of the characteristics either of the amplifier 22 or 24.

It should be understood that absolute correction is not possible, since with absolute correction no feedback signal would appear, but the total distortion introduced in the recording process may be reduced to a very low level.

Instead of providing the head with two windings 17 and 19 as shown, the feedback signal may be applied to a single winding 17 used for recording as well.

What is claimed is:

1. Apparatus for recording on magnetic tape including in combination a magnetic recording head to which signals for recording are fed, a second magnetic head positioned opposite said recording head for passage of magnetic tape therebetween, each of said heads comprising at least one magnetic circuit and having a single gap, the gaps of said heads being precisely aligned with each other on opposite sides of the tape, means associated with said second head for producing feedback signals having distortion characteristics derived from signals induced in said second head responsive to the recording process, said means for producing said feedback signals including means for comparing and deriving, from signals from said second magnetic head and recording signals to be applied to said recording head, difference signals having distortion characteristics corresponding with the distortion due to the recording process and constituting said feedback signals, and means for applying said feedback signals to said recording head, whereby to correct recording distortion.

2. Apparatus as claimed in claim 1 including means for modifying the feedback signals in a manner to substantially compensate for distortion produced in said second magnetic head.

3. Apparatus as claimed in claim 1 including means for correcting for phase shift occurring between signals derived from said second magnetic head and the recording signals applied to said recording head.

4. A magnetic tape recorder comprising a magnetic recording head and a magnetic monitoring head positioned opposite each other, means for feeding magnetic tape past and between said heads, said heads each comprising at least one magnetic circuit and having a single gap, means for feeding recording signals to said recording head, said gaps being positioned substantially in alignment for generating monitoring signals in said montoring head corresponding to the recording signals plus distortion arising during recording, means for comparing said monitoring signals with said recording signals and deriving difference signals corresponding to said distortion, and means for feeding said difference signals to said recording head for correcting said distortion.

5. A magnetic tape recorder as claimed in claim 4 in which said recording head includes a winding and both said means for feeding said recording and difference signals are connected to said winding.

6. A magnetic tape recorder as claimed in claim 4 in which said recording head includes two windings, said means for feeding said recording signals being connected to one of said windings and said means for feeding said difference signals being connected to the other of said windings.

7. A magnetic tape recorder including two magnetic heads positioned opposite each other one on each side of the path of a magnetic recording tape, means for feeding magnetic tape past said two heads and therebetween, each of said heads comprising at least one magnetic circuit and having a single gap, the gaps of said heads being accurately aligned with each other on opposite sides of the tape, means for feeding recording signals to one of said heads, the second of said heads including a winding, an amplifier connected to said winding for amplifying signals from said second head induced in said winding during recording, means connected to said amplifier for correcting phase shift in signals from said second head, a differential amplifier having inputs connected to the output of said phase-correcting means and to said recording signal feeding means and said differential amplifier having an output connected to said first-mentioned head.

8. A magnetic tape recorder as claimed in claim 7 including a first input amplifier having an input adapted for connection to a source of input signals to be recorded and having an output connected to said first-mentioned head, a second input amplifier having an input adapted for connection to said source of input signals and having an output connected to an input of said differential amplifier.

9. A magnetic tape recorder as claimed in claim 7 in which the said two magnetic heads are positioned to contact respectively the opposite sides of said tape.

10. A magnetic tape recorder as claimed in claim 7 in which said first-mentioned head includes a winding and means for feeding both said recording signals and said feedback signals to said winding.

11. A magnetic tape recorder as claimed in claim 7 in which said first-mentioned head includes two windings, means for feeding said recording signals to one of said windings and means for feeding said feedback signals to the other of said windings.

References Cited by the Examiner

UNITED STATES PATENTS

| | | | |
|---|---|---|---|
| 1,943,899 | 1/34 | Muller. | |
| 2,423,285 | 7/47 | Badmaieff ---------- | 179—100.3 |
| 2,649,506 | 8/53 | Gayford et al. ------- | 179—100.2 |
| 2,737,646 | 3/56 | Muffly ----------- | 179—100.2 X |
| 2,774,056 | 12/56 | Stafford et al. | |
| 2,873,319 | 2/59 | Mee --------------- | 179—100.2 |

IRVING L. SRAGOW, *Primary Examiner.*

DAVID G. REDINBAUGH, BERNARD KONICK, *Examiners.*